United States Patent
Becher et al.

(10) Patent No.: US 12,162,432 B2
(45) Date of Patent: Dec. 10, 2024

(54) SENSOR UNIT FOR A CAR LOCKING SYSTEM

(71) Applicants: INTEVA FRANCE SAS, Sully sur Loire (FR); Marquardt GmbH, Rietheim-Weilheim (DE)

(72) Inventors: Andreas Becher, Villingen-Schwenningen-Obereschach (DE); Christian Holdenried, Villingen-Schewenningen (DE); Oliver Huppenbauer, Villingen-Schwenningen (DE); Jean-Marc Belmond, Saint-Jean le Blanc (FR); Pascal Philippe, Saulcy / Meurthe (FR)

(73) Assignee: INTEVA FRANCE, Sully sur Loire (FR)

( * ) Notice: Subject to any disclaimer, the term of this patent is extended or adjusted under 35 U.S.C. 154(b) by 394 days.

(21) Appl. No.: 17/493,578

(22) Filed: Oct. 4, 2021

(65) Prior Publication Data
US 2022/0024409 A1    Jan. 27, 2022

Related U.S. Application Data

(63) Continuation of application No. PCT/IB2019/000298, filed on Apr. 2, 2019.

(51) Int. Cl.
*B60R 25/24* (2013.01)
*B60R 25/01* (2013.01)

(52) U.S. Cl.
CPC .............. *B60R 25/24* (2013.01); *B60R 25/01* (2013.01); *B60R 2325/103* (2013.01); *B60R 2325/205* (2013.01)

(58) Field of Classification Search
None
See application file for complete search history.

(56) References Cited

U.S. PATENT DOCUMENTS

| 10,343,650 B1 * | 7/2019 | Ahmad ............... G07C 9/00571 |
| 2017/0050616 A1 | 2/2017 | Liubakka et al. |
| 2018/0367139 A1 * | 12/2018 | Pribisic .............. H03K 17/9622 |

(Continued)

FOREIGN PATENT DOCUMENTS

| DE | 102013102701 A1 | 9/2014 |
| WO | 2014146949 A1 | 9/2014 |

(Continued)

OTHER PUBLICATIONS

First Chinese Office Action for Chinese Application No. 201990001386.4 Issued Jun. 15, 2022, 2 Pages.

(Continued)

*Primary Examiner* — Tamara L Weber
(74) *Attorney, Agent, or Firm* — CANTOR COLBURN LLP

(57) ABSTRACT

A sensor unit for a car locking system having a touch and/or proximity sensor with an outer surface including a sensor area covered by a sensor area cover adapted to or integrated in the outside shape of a car sealing, preferably a door sealing, window sealing, flap sealing, etc. The sensor unit includes an NFC-Sensor for interaction with smart devices like smart cards, smartphones or the like and the NFC-Sensor has a NFC-Antenna.

12 Claims, 3 Drawing Sheets

(56) References Cited

U.S. PATENT DOCUMENTS

Figure 1:
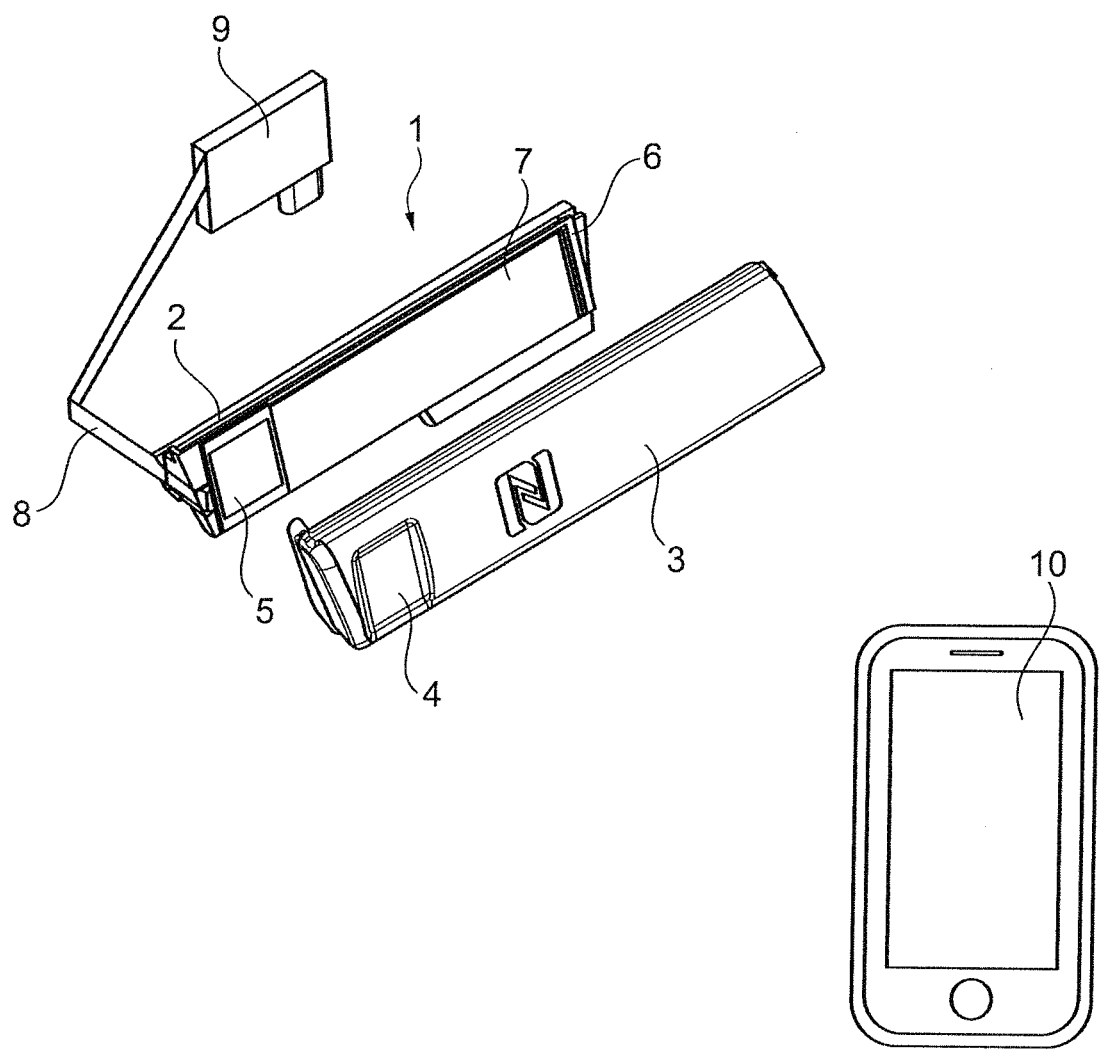

2019/0217817 A1* 7/2019 Wisbauer ............... B60R 25/24

FOREIGN PATENT DOCUMENTS

WO     2017151685 A2    9/2017
WO     2018108383 A1    6/2018

OTHER PUBLICATIONS

International Search Report for International Application No. PCT/IB2019/000298; Application Filing Date: Apr. 2, 2019; Date of Mailing: Nov. 26, 2019; 4 pages.
Written Opinion for International Application No. PCT/IB2019/000298; Application Filing Date: Apr. 2, 2019; Date of Mailing: Nov. 26, 2019; 6 pages.
EPO Communication pursuant to Article 94(3) EPC corresponding to EP Application No. 19 724 225.8; Issue Date, Jun. 27, 2024.

* cited by examiner

SENSOR UNIT FOR A CAR LOCKING SYSTEM

CROSS REFERENCE TO RELATED APPLICATIONS

This application is a continuation application of PCT/IB2019/000298, filed on Apr. 2, 2019, the entire contents of which are incorporated by reference thereto.

The invention relates to a sensor unit for a car locking system according to the first part of claim 1.

Since some years the keyless access of cars is triggered by a sensor in a door handle, which the user has to touch to unlock the door. Therefore an electronic module with a touch or proximity sensor is integrated into the door handle, which has an electrical interface to an electronic control unit for access control to communicate the touch event to the electronic control unit for access control.

Also car locking systems are known, which offer a NFC interface for Smart Access via i.e. Smartphone or Smartcard. The NFC interface is also used as backup communication interface for Smart Access in case of empty Smartphone battery.

In the document WO 2017/151685 a car locking system is disclosed, wherein a sensor unit having a touch and/or proximity sensor, which is integrated into the shape of a car sealing, i.e. a door sealing, window sealing, flap sealing etc.

Furthermore in this document the use of a NFC-Sensor is shown to handle the door opening by means of smart mobile devices like mobile phones. In this system the NFC sensor is arranged separately to the other sensors.

An object of this invention is to provide a car locking system with an improved arrangement of the NFC-sensor.

Starting from a car locking system according to the first part of claim 1 this object is achieved by the characters of the characterizing part of claim 1.

According to the invention a sensor unit for a car locking system having a touch and/or proximity sensor with an outer surface comprising a sensor area covered by a sensor area cover adapted to or integrated in the outside shape of a car sealing, preferably a door sealing, window sealing, flap sealing, etc. is improved in that the sensor unit comprises an NFC-Sensor for interaction with smart devices like smart cards, smartphones or the like, wherein the NFC-Sensor has a NFC-antenna, which is arranged joined to the sensor area and covered by an antenna cover adapted to or integrated in the outside shape of the vehicle sealing, preferably a door sealing, window sealing, flap sealing, etc.

So the invention offers a solution of a keyless touch and/or proximity unlock or release combined with the possibility of a smart access. The sensor system of the invention is usable to enable the opening of any car door, however especially of car doors without door handle. Although the sensor system is nearly invisible because it is integrated into the visible surface of a door sealing.

Preferably the sensor area cover and the antenna cover are merged to a single sensor unit cover. Thereby the optical integration into the visible sealing surface is once more improved.

For an appropriate optical impression of the sensor unit the sensor cover and the antenna cover are shaped equally.

In a further embodiment of the invention a common housing is provided for the touch and/or proximity sensor and the NFC-antenna shaped in the form of a car sealing. In this embodiment there is a single unit for integration into the car sealing, which is easier to assemble.

Advantageously the sensor unit is positioned in a recess of the door sealing, especially in case of a common housing for the touch and/or proximity sensor and the NFC antenna. This recess con be moulded into the sealing but in a preferred embodiment the sealing is simply cut off to clear a space for the sensor unit.

In case of a touch sensor the sensor area has a touch panel or touch button for the touch sensor. In case of a proximity sensor a recess or a window is provided for the proximity sensor, i.e. a capacitive, inductive or IR sensor.

Advantageously the sensor unit comprises an electronic module and is located in the car door, which again is connected to DCU (door controlling unit) of the car and/or to an electronic control unit for access. The DCU can operate the locking or unlocking of the door and control automatic door movements.

The electronic control unit for access can operate all necessary steps for the authorization of access and optionally the control of the ignition lock.

Such an electronic control module has at least one, preferably two interfaces to connect the sensor area and the NFC-antenna.

An embodiment of the invention is shown in the drawings.

In Detail Show

Figure 2:
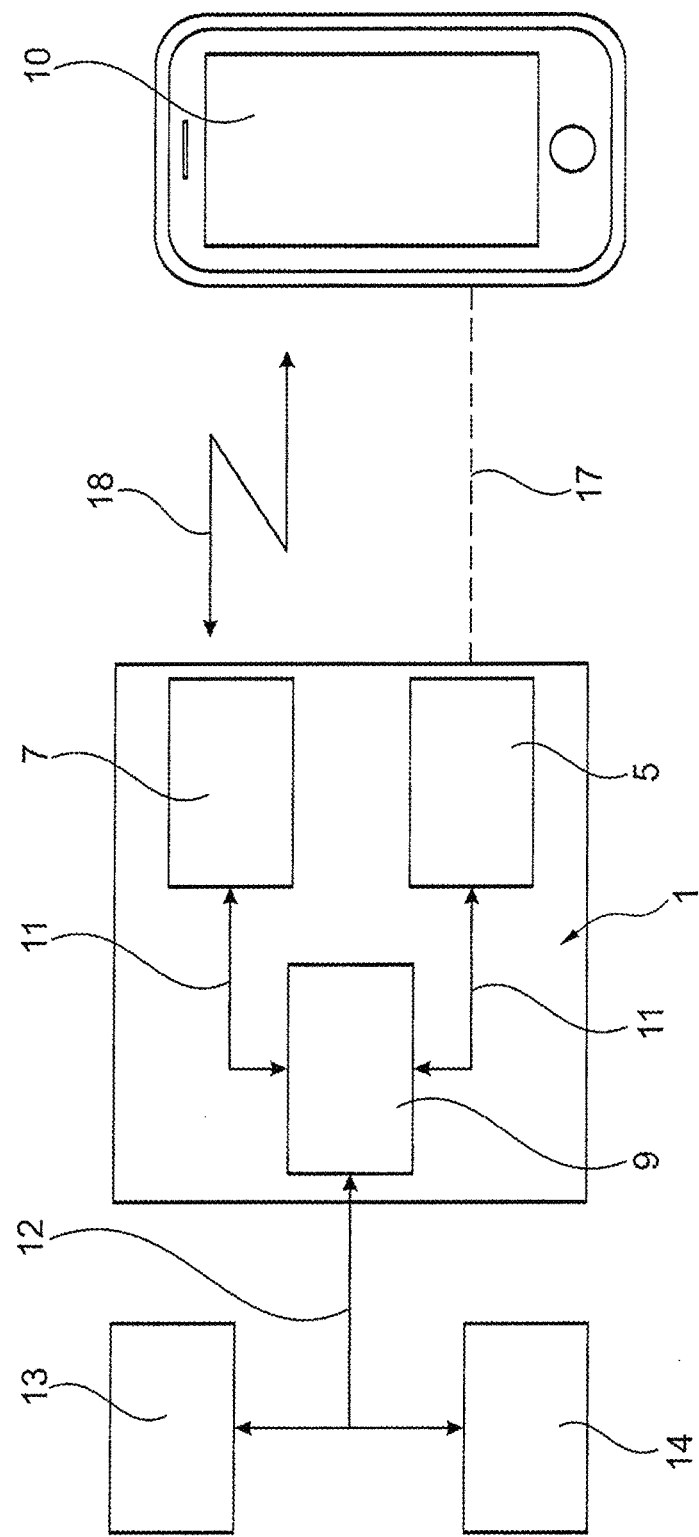

FIG. 1 a schematic perspective view of a sensor unit,

FIG. 2 a block diagram of the sensor unit and its connections and

Figure 3:
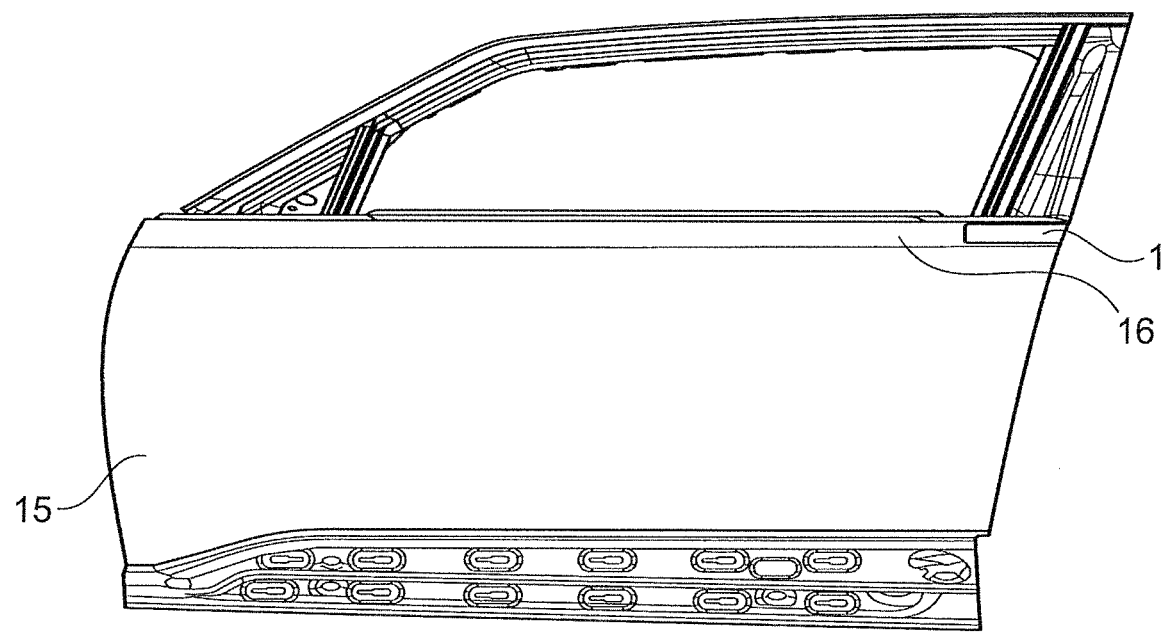

FIG. 3 a perspective view to a car door.

The sensor unit 1 in FIG. 1 has housing 2 and a cover 3. The cover 3 is shaped equally to a door sealing of the car (not shown) and has a window 4 for a sensor in the sensor area 5. In the housing are located a printed circuit board (PCB) 6, i.e. a flexible PCB, a NFC antenna 7 and the sensor area 5.

Connected to the PCB 6 there is another flexible PCB 8 which leads to an electronic module 9 arranged in the car door. In a distance to the sensor unit 1 a mobile phone 10 is shown to illustrate the use of the sensor unit 1.

In FIG. 2 the electronic module 9 is shown with connections 12 to a DCU 13 and an electronic control unit for car access 14. On the other side the electronic module 9 is connected with connections 11 to the NFC antenna 7 and the touch and/or proximity sensor in the sensor area 5. So the electronic module 9 can detect the proximity illustrated by the dotted line 17 of an object like the mobile phone 10, a car key, a smartcard, etc. and/or communicate via the NFC-connection 18. After the detection of the proximity of the object, i.e. the mobile phone 10 the NFC-communication 18 is started.

In FIG. 3 the position and form of the sensor unit 1 in the car door 15 is illustrated. The sensor unit 1 is prolonging a door sealing 16 and has the same shape as the door sealing 16.

With such a sensor unit 1 a keyless touch and/or proximity unlock or release combined with the possibility of a smart access is realized, wherein the sensor system is usable to enable the opening of any car door 15, however especially of car doors without door handle and the sensor system is integrated into the visible surface of a door sealing 16.

1 sensor unit
2 housing
3 cover
4 window
5 sensor area
6 PCB
7 NFC antenna 8 flexible PCB
9 electronic module
10 mobile phone
11 connection
12 connection
13 DCU
14 electronic control unit for access
15 car door
16 door sealing
17 proximity detection
18 NFC-communication

The invention claimed is:

1. A sensor unit for a car locking system having a touch and/or proximity sensor with an outer surface comprising a sensor area covered by a sensor area cover adapted to or integrated in an outside shape of a car sealing, wherein the car sealing is a door sealing and the sensor unit has the same shape as the door sealing and is a prolonging of the door sealing, the sensor unit including an NFC-Sensor for interaction with smart devices and the NFC-Sensor has a NFC-Antenna, wherein the sensor area cover has a recess or window for the proximity sensor.

2. The sensor unit according to claim 1 wherein, the NFC-Antenna is joined to the sensor area and covered by an antenna cover shaped for integration in the outside shape of the car sealing.

3. The sensor unit according to claim 2, wherein the sensor area cover and the antenna cover are merged to a single sensor unit cover.

4. The sensor unit according to claim 2, wherein an outer surface of the sensor area cover and the antenna cover are shaped equally.

5. The sensor unit according to claim 2, wherein the antenna cover and/or the sensor area cover and/or the single sensor unit cover is adapted to be located in a recess of the car sealing.

6. The sensor unit according to claim 1, wherein a common housing shaped in a form of the car sealing is provided for the NFC-Sensor and the NFC-Antenna.

7. The sensor unit according to claim 1, wherein the sensor area cover has a touch panel or a touch button for the touch sensor.

8. The sensor unit according to claim 1, wherein an electronic module is connected to a door controlling unit of the car and/or to an electronic control unit for access of the car is provided.

9. The sensor unit according to claim 8, wherein the electronic module is connected via an interface to the NFC antenna and/or via an interface to the sensor area.

10. The sensor unit as in claim 1, wherein the smart devices are selected from the group comprising: smart cards; and smartphones.

11. A car locking system including the sensor unit of claim 1.

12. A car including the car locking system according to claim 11.

* * * * *